United States Patent
Bogiatzis (10) Patent No.: US 9,415,879 B2
(45) Date of Patent: Aug. 16, 2016

(54) DEVICE FOR PREVENTING THE PASSAGE OF GASES AND/OR FLUIDS FROM A WINGBOX INTO A FUSELAGE OF AN AIRCRAFT

(75) Inventor: Christos Bogiatzis, Stuehr (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 911 days.

(21) Appl. No.: 13/264,802

(22) PCT Filed: Apr. 15, 2010

(86) PCT No.: PCT/EP2010/054983
§ 371 (c)(1),
(2), (4) Date: Dec. 27, 2011

(87) PCT Pub. No.: WO2010/119105
PCT Pub. Date: Oct. 21, 2010

(65) Prior Publication Data
US 2012/0098212 A1    Apr. 26, 2012

Related U.S. Application Data

(60) Provisional application No. 61/169,733, filed on Apr. 16, 2009.

(30) Foreign Application Priority Data

Apr. 16, 2009   (DE) .......................... 10 2009 017 644

(51) Int. Cl.
*B64D 37/32*    (2006.01)
*B64D 37/00*    (2006.01)
*B64C 3/34*    (2006.01)

(52) U.S. Cl.
CPC ............... *B64D 37/005* (2013.01); *B64C 3/34* (2013.01); *B64D 37/32* (2013.01); *Y02T 50/44* (2013.01)

(58) Field of Classification Search
CPC ...... B64D 37/06; B64D 37/005; B64D 37/08; B64D 37/22; B64D 37/32; B64C 3/34
USPC ...................................... 244/135 R
See application file for complete search history.

(56) References Cited

U.S. PATENT DOCUMENTS

| 2,460,368 A | 2/1949 | Snow |
| 2,508,906 A * | 5/1950 | Cunningham et al. ....... 220/4.14 |

(Continued)

FOREIGN PATENT DOCUMENTS

| CN | 1819947 A | 8/2006 |
| DE | 38 26 464 A1 | 2/1989 |

(Continued)

OTHER PUBLICATIONS

International Search Report for Appln. No. PCT/EP2010/054983 mailed Feb. 24, 2011.

(Continued)

*Primary Examiner* — Brian M O'Hara
(74) *Attorney, Agent, or Firm* — Carter, DeLuca, Farrell & Schmidt, LLP (57) ABSTRACT

A device is disclosed for preventing gases and/or fluids emanating from a wing box of an aircraft from passing to an aircraft fuselage cell situated underneath it. The device comprises at least one sheet-like material positioned below or above the wing box. The sheet-like material is preferably made of a woven fabric comprising aramid fibers or the like, which fabric in order to ensure the required seal vis-à-vis liquid and/or gaseous substances, in particular vis-à-vis fuels, has been impregnated or soaked with an epichlorohydrin elastomer compound or with some other elastomer, for example a rubber compound or the like.

13 Claims, 4 Drawing Sheets

(56) References Cited

U.S. PATENT DOCUMENTS

| | | | |
|---|---|---|---|
| 2,640,627 A | | 6/1953 | Doelter |
| 2,691,134 A | | 10/1954 | Ford |
| 2,736,356 A | * | 2/1956 | Oates, Jr. ......... B60K 15/03177 220/723 |
| 2,757,362 A | | 7/1956 | Gutkowski |
| 2,779,702 A | | 1/1957 | Wilson et al. |
| 3,199,812 A | | 8/1965 | Spoecker |
| 3,501,050 A | | 3/1970 | Versaw |
| 3,969,563 A | * | 7/1976 | Hollis, Sr. ................. B32B 3/28 220/62.11 |
| 4,393,997 A | * | 7/1983 | Gibler et al. .............. 244/135 R |
| 6,889,937 B2 | | 5/2005 | Simpson et al. |
| 6,915,861 B2 | * | 7/2005 | Goodworth ............. A62C 3/08 169/46 |
| 7,984,877 B2 | * | 7/2011 | Hasmann ............... B64D 37/06 137/312 |
| 2005/0241700 A1 | | 11/2005 | Cozens et al. |
| 2008/0264951 A1 | * | 10/2008 | Tweet et al. .............. 220/560.02 |
| 2009/0090724 A1 | | 4/2009 | Childress et al. |

FOREIGN PATENT DOCUMENTS

| | | |
|---|---|---|
| DE | 3826464 | 2/1989 |
| EP | 2 048 079 A2 | 4/2009 |
| EP | 2048079 A2 | 4/2009 |
| EP | 2239195 A1 | 10/2010 |

OTHER PUBLICATIONS

Chinese First Office Action dated Sep. 24, 2013 issued in counterpart Chinese Appln. No. 201080026671.5.

Chinese Second Office Action dated May 28, 2014 issued in counterpart Chinese Appln. No. 201080026671.5.

European Office Action dated Mar. 10, 2016, issued in European Application No. 10 713 674.9.

* cited by examiner

DEVICE FOR PREVENTING THE PASSAGE OF GASES AND/OR FLUIDS FROM A WINGBOX INTO A FUSELAGE OF AN AIRCRAFT

TECHNICAL FIELD

The invention relates to a device for preventing gases and/or fluids emanating from a wing box of an aircraft from passing to a fuselage cell of the aircraft.

BACKGROUND

In modern aircraft the tanks are preferably integrated in the wings. This results in space savings in the region of the fuselage cell and at the same time in a reduction in weight and in an advantageous distribution of mass.

In particular in aircraft of a so-called high-wing construction there is however a problem in that in the case of the slightest leakage in the wing tank, fuel and/or volatile substances enter the fuselage cell situated below. Nonetheless in the past not all aircraft types were equipped with protective devices for this eventuality, a situation which against the background of increasingly stringent safety regulations and environmental regulations in modern aircraft construction is no longer acceptable.

The same problem, albeit to a lesser extent, exists in the case of passenger aircraft and cargo aircraft of the known low-wing design, in which any uncontrolled leakage of at least gaseous substances from the wings situated underneath the fuselage cell and the wing box with the wing tanks provided therein to the passenger cabin needs to be stopped, in particular in order to prevent health hazards and in order to meet the requirements of the airworthiness authorities.

The solutions known from the state of the art are, however, either too expensive or of too rigid a design, and consequently result in an often unacceptable increase in weight, and/or their sealing effect is not guaranteed with adequate safety over the expected lifetime or the prescribed maintenance cycles of the aircraft.

It is the object of the invention to create a safe and at the same time also easily installable barrier to prevent liquids and/or gases from a wing tank from entering the fuselage cell structure of an aircraft, which barrier, moreover, provides adequate mechanical strength vis-à-vis the pressure differentials experienced.

SUMMARY

This object is met by a device with the characteristics of claim 1.

Due to the fact that a border is positioned in a region of a bottom or a top of the wing box, and at least one sheet-like material is arranged in the region of the circumferential border, minimal weight of the barrier results as does at the same time an optimal sealing effect vis-à-vis liquids and/or gases that in the case of a fault can emanate from a fuel tank in the region of the wing box, for example in the form of a failure in a tank seal.

Apart from this, the sheet-like material makes it possible to achieve quick and simple installation and furthermore provides adequate flexibility during operation to be able to compensate for any movement, during flight operation, between a wing or the wing box and the wing tanks situated therein and the fuselage cell situated underneath it. Furthermore, by changing the geometry of the sheet-like material used, the device can easily be adapted to various aircraft types. Any deformation movement of the elastic sheet-like material based on pressure differentials experienced is limited by the wing box.

The sheet-like material is preferably made from a single piece. If need be the sheet-like material can also be produced by sewing at least two web-like partial sheet-like materials with the use of a suitable sewing thread, wherein in this case the overlapping seams, which are required to ensure the necessary seal, during production are sealed with the use of an epichlorohydrin elastomer compound or with the use of a rubber compound.

An advantageous improvement of the device provides for the sheet-like material to comprise a reinforcement, in particular comprising a thermoplastic woven fabric, a knitted fabric, an interlaid scrim or any combination thereof, which reinforcement at least in some regions is impregnated with an elastomer, in particular with an epichlorohydrin elastomer compound.

This results in a hermetic sealing effect of the device vis-à-vis liquids and/or volatile substances, in particular gases, while at the same time providing outstanding elasticity for tolerance compensation and vis-à-vis relative movement between the wing box and the fuselage cell. Preferably a woven Aramid® fabric impregnated with or soaked in an epichlorohydrin rubber compound is used for thermoplastic reinforcement. As an alternative it is also possible to use glass fibers, carbon fibers, natural fibers or metal fibers as the reinforcement fabric.

Moreover, the elastomer or the rubber material used comprises anti-static characteristics so that ignition of explosive gas mixtures in the region of the device is nearly impossible. Such electrostatic charges can, for example, arise as a result of escaping fuels, frictional electricity and the like. In order to ensure adequate dissipation of static electricity, the sheet-like material used in the device comprises a defined surface resistance per unit of area of between 200 kΩ and 500 MΩ. auf. Contact resistance between two sheet-like materials that have been bonded so as to overlap is approx. 2.8 MΩ with an overlap of 75 mm, and approx. 270 kΩ with an overlap of 50 mm.

A further advantageous design of the device provides for the sheet-like material to be connected to the wing box by means of the border, wherein the border comprises at least one holding profile and at least one counterholding profile for clamping the sheet-like material on the edge.

This provides circumferential, firm, and above all hermetically sealed accommodation of the device, for example on a bottom of the wing box of an aircraft. In order to make it possible to connect the sheet-like material a multitude of corresponding drill holes or holes have been made in the margin region of the sheet-like material, in the holding profile and in the counterholding profile. The drill holes are preferably arranged so as to be evenly spaced apart from each other. For the purpose of attaching the sheet-like material, for example threaded bolts and/or rivets are placed through the holes in the above-mentioned components and are fastened. Sealing takes place solely by clamping the sheet-like material between the holding profile and the counterholding profile.

In a preferred embodiment variant the holding profile attached to the bottom of the wing box can comprise a cross-sectional geometric shape which approximately comprises two limbs that abut at an angle of about 45°, wherein on a limb that points away from the sheet-like material a semicircular continuation follows. In contrast to this, the counterholding profile comprises a simple, approximately u-shaped cross-sectional geometric shape.

According to an improvement of the device, within the border in the region of at least one connection point of the wing box in each case at least one stay bolt is arranged for connecting the sheet-like material on the outer edge.

In this manner a further attachment option is created on the wing box. Preferably, on the outer edge, at least 36 connection points are provided within the sheet-like material, which connection points are arranged so as to be distributed over the sheet-like material in an approximately even grid.

A further advantageous embodiment provides for the sheet-like material to comprise at least one reinforcement region for connection in each case to a stay bolt, and for a metallic sleeve with an elongated hole to be integrated in the reinforcement region, in particular bonded in and/or vulcanized in.

In this manner an even introduction of force is ensured and pulling out the sheet-like material in the region of the connection points is prevented.

An improvement provides for the at least one stay bolt to be connected, in particular riveted, bolted and/or bonded, to the wing box, and for the at least one stay bolt to comprise a threaded portion, wherein a nut can be placed onto the threaded portion for non-positive locking connection between the sleeve and a base of the stay bolt.

As a result of the firm connection of the stay bolt to the wing box and the attachment of the sleeve on the stay bolt by means of the nut a safe seat of the sheet-like material underneath the wing box is ensured. In this context the notion of "bolting" defines a screw-type connection.

A further advantageous embodiment provides for the provision of an eccentric polygonal disc between the sleeve and the nut, wherein the eccentric polygonal disc can be placed in a longitudinal groove in a sleeve flange at least in part in a positive-locking manner, such that rotating the eccentric polygonal disc by an angular amount of less than or equal to 90° results in defined graduated alignability of the sheet-like material parallel to a longitudinal axis of the fuselage cell.

By rotating the eccentric polygonal disc, tolerance compensation can take place in a simple manner.

According to a further development, the sheet-like material comprises at least one undulation, placed approximately parallel to a longitudinal axis of the fuselage cell, in order to make it possible to provide additional alignability of the sheet-like material across the longitudinal axis of the fuselage cell in relation to the wing box.

As a result of the undulations, on the one hand a tolerance compensation possibility across the longitudinal axis of the fuselage cell is provided, and on the other hand collection and dissipation of liquids collected by the sheet-like material is improved.

According to a further improvement, in the region of at least one undulation trough of the at least one undulation at least one drainage connection with a hose line connected to it for dissipation of any fluids and/or gases emanating from the wing box is provided.

As a result of this arrangement of the drainage connection efficient dissipation of collected fluids or liquids is provided.

According to a further embodiment the at least one reinforcement region of the sheet-like material is preferably arranged in the region of an undulation peak. As a result of this arrangement of the reinforcement regions the formation of undulations within the sheet-like material is assisted.

DETAILED DESCRIPTION

In the drawings the same design elements comprise identical reference characters.

Figure 1:
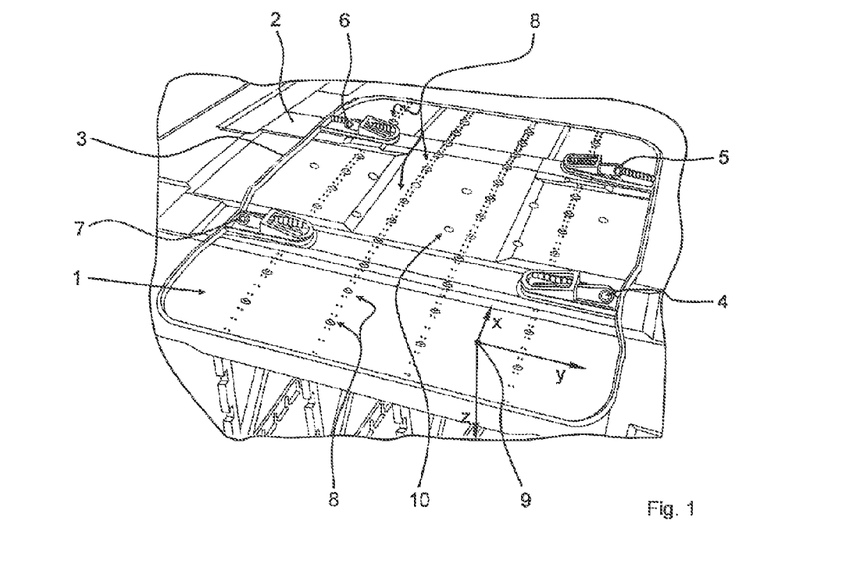
FIG. 1 is a perspective view of a bottom of a wing box of an aircraft, which wing box has not yet been covered by means of the device.

FIG. 1 illustrates a perspective view of a bottom of a wing box of an aircraft, which wing box has not yet been covered by means of the device.

In the region of a bottom 1 of a wing box 2 of an aircraft of a high-wing construction, above a fuselage cell (not shown) a circumferential border 3 is arranged. The border 3 is used for connection on the edge region of the sheet-like material (not shown in FIG. 1) of the device to the bottom 1 of the wing box 2. In the region of the border 3 there are four fittings 4 to 7 that are used to connect further components (not shown in the illustration). Depending on the type of aircraft, the border 3, which is of approximately rectangular geometric shape, comprises a surface extension of, as a rule, several square meters and approximately corresponds to the contour of a recess (also not shown in FIG. 1) which in the case of a high-wing construction of the aircraft in the context of connecting a wing is necessary in an upper region of the aircraft fuselage cell. In the exemplary embodiment shown in FIG. 3, within the border 3 a total of 36 connection points are provided over a surface covered by the border 3, which connection points are arranged in an essentially uniform grid, of which connection points one is designated by reference character 8 in a manner representative of all the further connection points. The connection points are used for additional attachment, on the outer edge, of the sheet-like material of the device to the bottom 1 of the wing box 2.

In all the figures spatial orientation is illustrated by a coordinate system 9 whose x-axis extends parallel to a longitudinal axis of the fuselage cell of the aircraft. In this arrangement the orientation of the x-axis is against a direction of flight of the aircraft. The z-axis of the coordinate system 9 points away perpendicularly from the ground, and the y-axis of the coordinate system 9 extends across the x-axis or the longitudinal axis of the fuselage cell of the aircraft.

Furthermore, a multitude of drainage points are provided, with only one of said drainage points being designated by reference character 10. The drainage points are used for controlled dissipation of liquid and/or gaseous substances, by way of drainage connections embedded in the sheet-like material, which substances have been collected by the sheet-like material of the device. In this arrangement the drainage points are positioned so as to be distributed over the surface delimited by the border 3 in such a manner that independently of any relative movement between the fuselage cell and the wing box 2, which movement occurs in flight and at various operational states of the aircraft on the ground, at all times complete, controlled and uniform dissipation of the liquids collected by the device is achieved.

Figure 2:
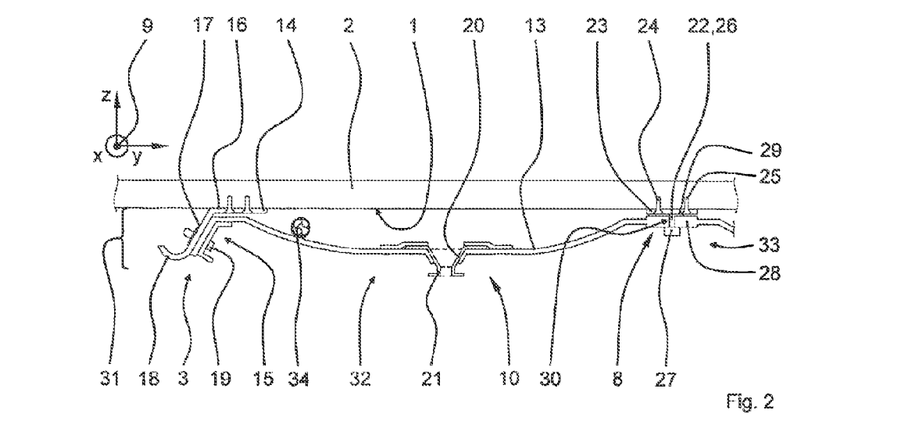
FIG. 2 is a simplified cross-sectional view of an edge region of the device.

FIG. 2 illustrates a simplified section view of the device.

A device designed according to the invention among other things comprises a sheet-like material 13 that is stretched, in an undulating manner, by means of the border 3 on the edge at the bottom of the wing box 2 and is attached at that location. The sheet-like material 13 is preferably made of a woven fabric comprising aramid fibers, which fabric in order to produce a complete seal to fluid and pressure is impregnated with a rubber-like epichlorohydrin elastomer compound, and which woven fabric moreover comprises the necessary mechanical resilience.

The border 3 for holding the sheet-like material 13 on the margin comprises among other things a holding profile 14 and a counterholding profile 15. The counterholding profile 15 ideally comprises an approximately u-shaped cross-sectional geometric shape while the cross-sectional geometric shape of the holding profile 14 comprises a first limb 16 to which a second limb 17 is joined at an angle of about 45°. The second limb 17 makes a transition to a semicircular end section 18. The first limb 16 of the holding profile 14 is connected to the wing box 2 by means of two rivets (not shown with a reference character).

The rivets have been hermetically sealed with the use of a suitable sealant. At the edge, the sheet-like material 13 is firmly clamped between the second limb of the holding profile 14 and the counterholding profile 15 of the border 3. Clamping the sheet-like material 13 takes place by means of a connecting element 19 which is, for example, a bolt connection or a rivet connection. As an alternative, an adhesive connection is also possible. In order to make it possible to achieve the bolt connection shown, a multitude of drill holes or holes are made in the holding profile 14, in the counterholding profile 15 and in the edge region of the sheet-like material 13, which drill holes or holes are preferably arranged so as to be evenly spaced apart from each other. The necessary seal is established in the region of the border 3 by means of the sheet-like material 13 that is firmly squeezed between the holding profile and the counterholding profile 14, 15. Both the holding profile and the counterholding profile 14, 15 can comprise profile sections arranged next to each other.

In the section of the drawing shown in FIG. 2 a drainage connection 20 is integrated in the sheet-like material 13 in the region of the drainage point 10, which drainage connection 20 is used, in particular, to dissipate liquids and/or gases that are collected by the sheet-like material 13 or that are retained by said sheet-like material 13 from the interior of the aircraft fuselage cell. Integration of the drainage connection 20 in the sheet-like material 13 takes place at the manufacturer's, for example by bonding or vulcanizing it into place.

In order to make it possible to connect a hose or a hose line (not shown in FIG. 2) of a complex hose line system, the approximately funnel-shaped drainage connection 20 comprises a flange 21 in the region of a bottom end section, which flange 21 comprises sealants (not shown in more detail). By means of the flange 21 a hose line that is to be connected to the drainage connection 20 can easily be connected to the latter by means of threaded bolts and/or other connecting mechanisms, if necessary easily undoable for maintenance purposes. Preferably, in the region of the drainage connection 20, reinforcement elements (not shown), for example circular discs comprising a fiber-reinforced epoxy resin material or the like, are bonded in and/or on the sheet-like material 13 or are vulcanized into it.

In addition to attachment on the edge, the sheet-like material 13 is connected at the connection point 8 on the outer edge to the bottom 1 of the wing box 2. Such attachment takes place by means of a stay bolt 22 comprising a circular base 23. The base 23 is connected by means of at least two connecting elements 24, 25, for example in the form of rivets and/or bolts, to the wing box 2. If necessary the connecting elements 24, 25 are sealed vis-à-vis the wing box 2. This can take place, for example, by slightly countersinking the connecting elements 24, 25 and by subsequently filling the indentation created in this manner, for example with epichlorohydrin rubber compound. Furthermore, in an end region the stay bolt 22 comprises a threaded portion 26 to which a nut 27 is attachable. An approximately circular ring-shaped reinforcement region 28 with a sleeve 29 vulcanized into place, which reinforcement region 28 has been provided in the sheet-like material 13, forms an integral part of the sheet-like material 13. The sleeve 29 comprises an elongated hole 30, so that a tolerance compensating means parallel to the x-axis of the coordinate system 9 is provided. By placing the sleeve 29 onto the stay bolt 22, which in this region does not have a thread, and by tightening the nut 27 on the threaded portion 26, a nonpositive locking connection is created.

Furthermore, the sheet-like material 13 comprises an undulation 31 of low amplitude height. In the region of an undulation trough 32 and thus at the lowest point the drainage connection 20 is arranged in order to ensure reliable dissipation of the liquids and/or volatile substances retained by the sheet-like material 13. In contrast to this, an undulation peak 33 of the undulation 31 forms in the region of the stay bolt 22 and is thus situated in the region of the connection point 8 of the wing box 2. Because of the undulating structure of the sheet-like material 13 it is possible in addition to compensate for tolerances and/or intrinsic movements of the wing box 2 as well as tolerance deviations of the stay bolt 22 attached thereto, parallel to the y-axis of the coordinate system 9. Apart from the shown undulation trough 32 the sheet-like material comprises a multitude of further undulation troughs that extend parallel to the above and at a distance. As an example, a liquid droplet 34 is shown that rests on the sheet-like material 13, which liquid droplet 34 is dissipated in the direction of the drainage connection 20.

Figure 3:
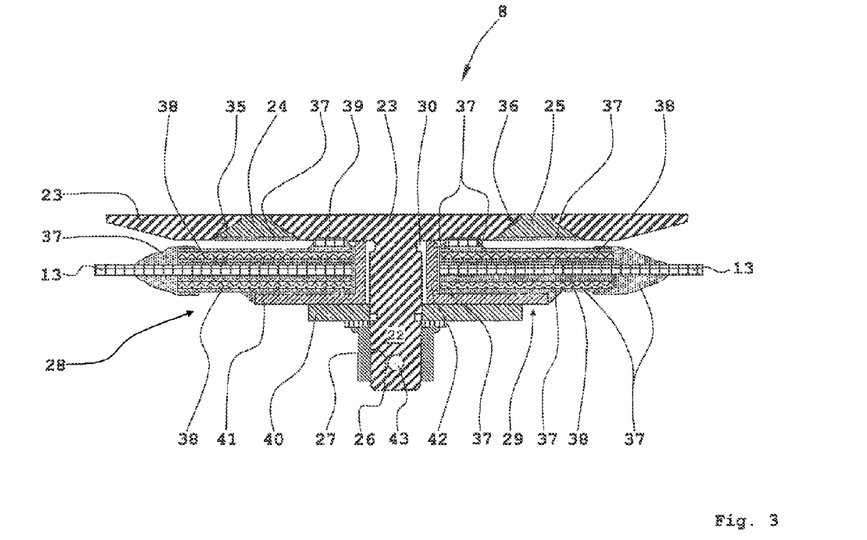
FIG. 3 is a detailed section view of the stay bolt according to FIG. 2.

FIG. 3 shows a detailed section view of the stay bolt according to FIG. 2.

The base 23 of the stay bolt 22 comprises two countersunk holes 35, 36 for accommodating the connecting elements 24, 25. Hermetically sealing the countersunk holes 35 and 36 takes place after placement of the connecting elements 24, 25, by applying a suitable sealant 37 in a flush manner. The sealant 37 is preferably an epichlorohydrin rubber compound. In the region of the connection point 8 the sheet-like material 13 comprises a circumferential reinforcement region 28 into which the sleeve 29 is integrated, in particular vulcanized, with the use of the sealant 37. The elongated through hole 30 comprising an approximately cross-sectional geometric shape has been made in the sleeve 29. The reinforcement region 28 comprises two circular reinforcement flanges 38, one applied to each side of the sheet-like material, which reinforcement flanges 38 (in FIG. 3 for the sake of clarity not shown with a reference character but instead indicated by dotted lines) are bonded, by means of an adhesive, for example by means of Permabond® 737 or the like, to the sheet-like material 13 and in addition are vulcanized into place all around with the sealant 37. The reinforcement flanges 38 integrated in the sheet-like material 13 comprise a fiber-reinforced epoxy resin material. Their fiber reinforcement can, for example, comprise glass fibers, carbon fibers or some other suitable reinforcement fibers. Furthermore, the reinforcement region 28 comprises an also circular vulcanized thickening 39 that faces in the direction of the base 23 of the stay bolt 22 and which during the installation process is compressed in order to improve the sealing effect. The thickening 39 equally comprises the sealant 37.

In order to press the reinforcement region 28 to the base 23 an eccentric polygonal disc 40 is provided which comprises an eccentric drill hole (not designated), which is arranged eccentrically in relation to a longitudinal axis of the stay bolt 22. The eccentric polygonal disc 40 is not screwed onto the stay bolt but is merely placed on it or slid onto it for positioning. By means of the nut 27, which can be screwed onto the threaded portion 26 of the stay bolt 22, the eccentric polygonal disc 40 is pressed against a sleeve flange 41 of the sleeve 29 vulcanized into the sheet-like material, and consequently a sleeve body 42 with a cross-sectional geometric shape that corresponds to an oval ring-shaped disc is non-positively locked to the base 23 of the stay bolt 22. In this process at the same time the thickening 39 is compressed parallel to the longitudinal axis of the stay bolt 22, and consequently the sealing effect in the connection point 8 is optimized.

Furthermore, a securing through-hole 43 is made in the threaded portion 26 on the end of the stay bolt 22. Said securing through-hole 43 is used to accommodate a securing means (not shown), for example a splint or a securing pin, to prevent unintended undoing of the nut 27 from the threaded portion 26.

The stay bolt 22 including the base 23 as well as the sleeve 29 and the eccentric polygonal disc 40 are formed with a metallic material, in particular with a stainless steel alloy or with a titanium alloy. In this arrangement the sleeve 29 forms an integral part of the sheet-like material.

Figure 4:
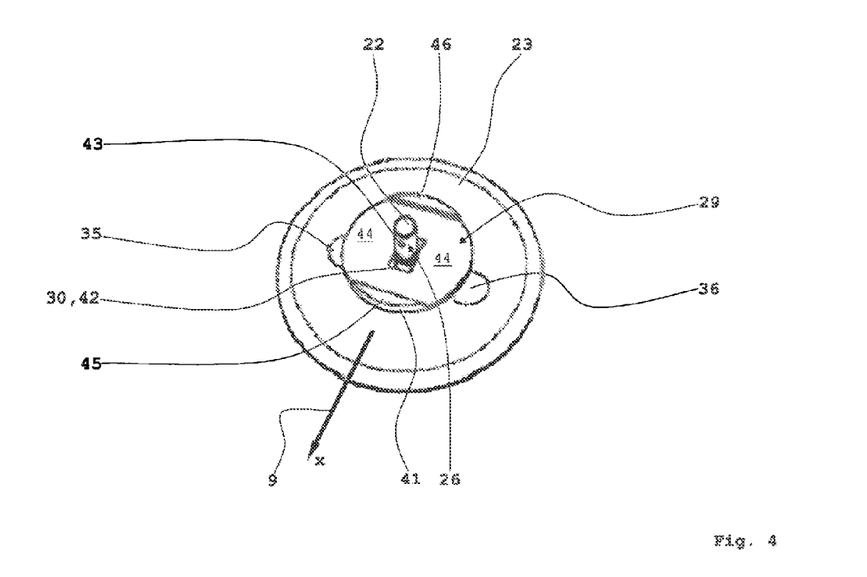
FIG. 4 is a top view of the stay bolt according to FIG. 3 with an eccentric polygonal disc put in place.

FIG. 4 illustrates an isometric view of the stay bolt with the base and the plugged-on sleeve, wherein the sleeve is shown without the vulcanized-on sheet-like material.

The base 23 with the two countersunk holes 35, 36 is essentially circular and on the edge region comprises a chamfer (not designated) of up to 45°. At the middle on the base 23 and perpendicular to the aforesaid there is the stay bolt 22 with the threaded portion 26, in which the securing hole 43 is located. The sleeve 29 has been put in place on the stay bolt 22. The sleeve flange 41 comprises a longitudinal groove 44 which on each side is delimited by a slope 45, 46 in the shape of a segment of a circle. Both the sleeve flange 41 and the sleeve body 42 comprise the elongated hole 30, as a result of which slidability of the sleeve 29, and thus also of the sheet-like material 13, parallel to the x-axis of the coordinate system 9 is provided. Between the slopes 45, 46 the eccentric polygonal disc 40 (not shown in the illustration) is accommodated in a positive-locking manner at least in some regions.

Figure 5:
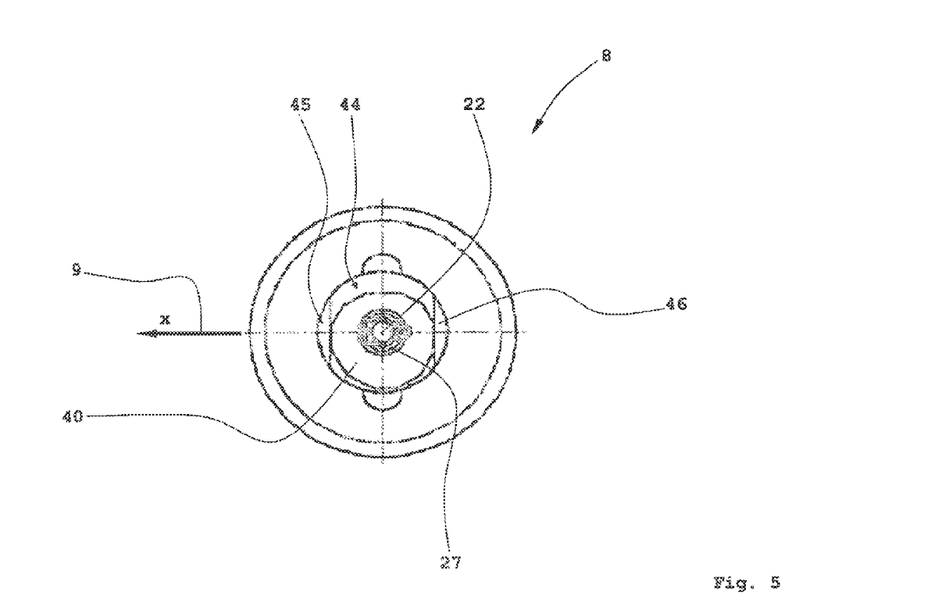
FIG. 5 is an isometric view of a stay bolt according to FIG. 4 with a nut.

FIG. 5 diagrammatically shows a top view of the stay bolt according to FIG. 4, but with the eccentric polygonal disc put in place and with the nut screwed on.

The eccentric polygonal disc 40, which in the exemplary embodiment shown comprises a total of twelve sides or edges of different lengths, is eccentrically held relative to the stay bolt 22, and consequently, as a result of the offset of the eccentric polygonal disc 40 in each case by 30° within the longitudinal groove 44 between the slopes 45, 46, in each case parallel to the x-axis of the coordinate system 9 a tolerance compensating means of, for example 0.5 mm, 1.0 mm, 1.5 mm, 2.0 mm and 2.5 mm, results.

As a result of this, the sheet-like material can thus be displaced or adjusted, parallel to the x-axis of the coordinate system 9, by the above-mentioned amounts of length in relation to the wing box or to the stay bolt 22 attached thereto, and consequently during installation of the device dimensional variations due to the manufacturing process and the like in the region of the wing box can be compensated for. By means of the nut 27 the eccentric polygonal disc 40 is finally set on the stay bolt 22 and thus, as a result of this, the sheet-like material in the connection point 10 is affixed in its intended adjusted position.

Figure 6:
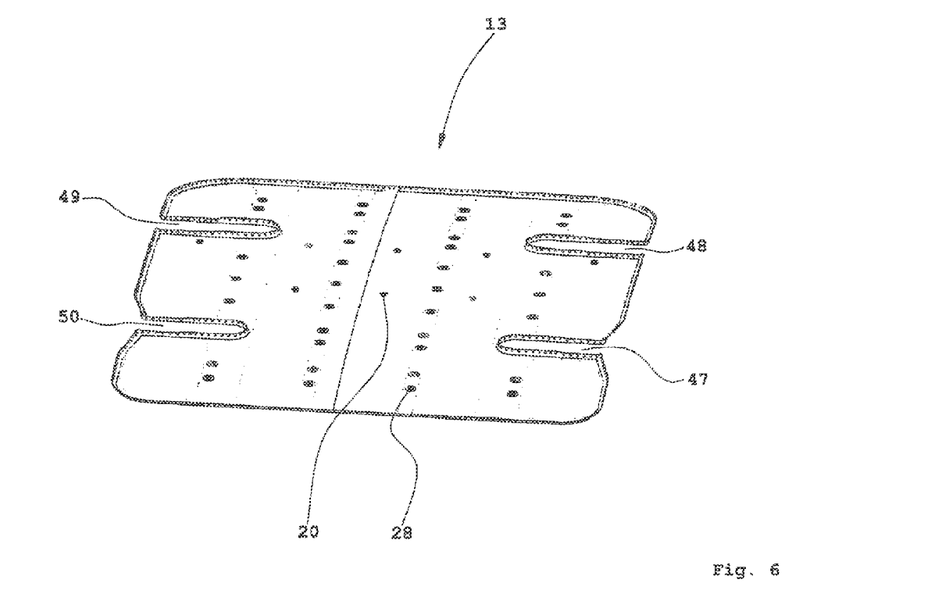
FIG. 6 is a perspective view of a sheet-like material with a multitude of reinforcement regions and drainage connections.

FIG. 6 shows a perspective oblique top view of the sheet-like material.

On the edge the single-piece sheet-like material 13 comprises a multitude of drill holes or holes (for the sake of clarity not individually designated but shown by small dots) in order to achieve a hermetically sealed edge attachment to the wing box by means of the border. In order to achieve a hermetically sealed and pressure tight connection of the fittings (compare in particular FIG. 1), the sheet-like material 13 comprises four approximately rectangular recesses 47 to 50.

Connecting the sheet-like material 13 to the bottom of the wing box 2 takes place according to the embodiment shown in FIG. 2 with holding profiles and counterholding profiles that together form the border. Moreover, the approximately rectangular sheet-like material 13 comprises 36 reinforcement regions for attachment, on the outer edge, to the wing box by means of the stay bolts in the connection points of the wing box 2, of which only the reinforcement region 28, representative of all the others, comprises a reference character. The design of the reinforcement regions is in accordance with the details already set out in the context of the description of FIG. 2.

Furthermore, in the shown exemplary embodiment of the sheet-like material 13 a total of eight drainage connections, of which drainage connection 20, representative of all the others, comprises a reference character, have been embedded or vulcanized or bonded into place.

All the drainage connections are interconnected by way of a hose line system (compare FIG. 7) comprising a multitude of hoses or hose lines in order to bring together liquids and/or volatile or gaseous substances retained or collected by the sheet-like material 13. By way of the hose line system the above-mentioned substances are dissipated to the environment of the aircraft. The hose lines of the drainage connections can be brought together to at least one collecting line by way of branch points in the form of T-pieces. The at least one collecting line is then connected to at least one outlet (not shown in the figures) in the region of a bottom of the fuselage cell of the aircraft. As an alternative it is also possible for each drainage connection to be individually connected by means of a hose line of its own, in each case to one outlet, in particular in order to minimize any danger of blockages occurring in the region of the branch points.

In each case the arrangement of the drainage connections preferably takes place at the lowest points of the sheet-like material 13, in other words in the region of the undulation troughs of the sheet-like material that comprises a multitude of undulations (compare in particular FIG. 2), wherein the hose lines are installed at an adequate and even gradient in order to ensure complete drainage of the liquids from the hose lines.

Figure 7:
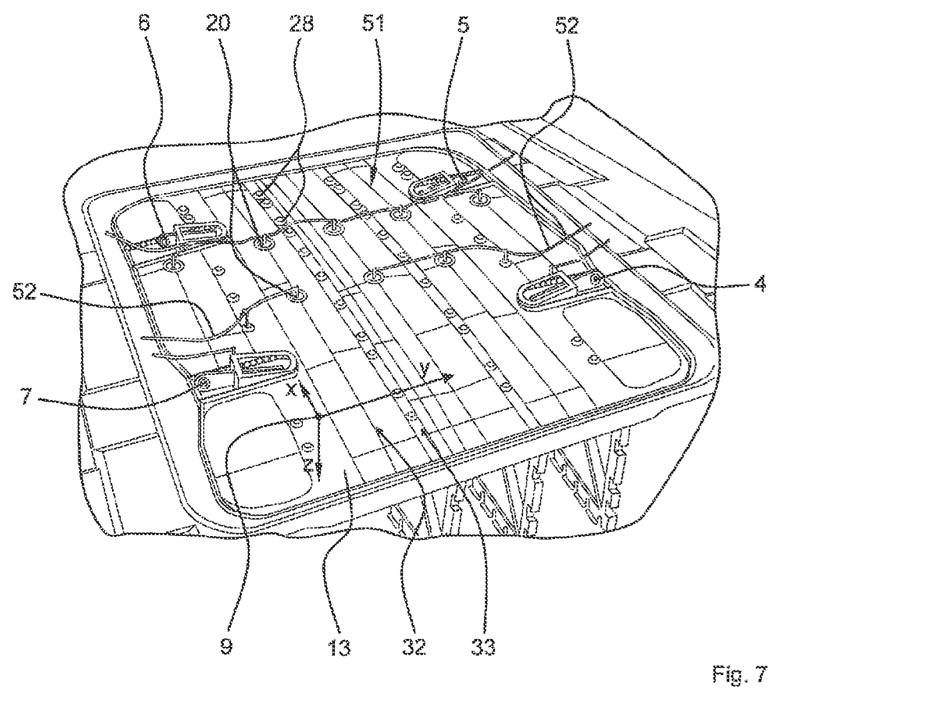
FIG. 7 is a perspective bottom view of the device with drainage connections and a multitude of hoses connected thereto.

In a further perspective view FIG. 7 illustrates the sheet-like material in an oblique bottom view.

Like all the remaining drainage connections, the drainage connection 20 is arranged in the region of an undulation trough 32 of the sheet-like material 13, while the reinforcement region 28, as is the case with all the further connection regions, is arranged on an undulation peak 33. As shown in FIG. 7, the apex lines or the base lines of the undulation structure of the sheet-like material 13 in each case extend parallel to the x-axis of the coordinate system 9. As already indicated in the context of the description of FIG. 6, the drainage connections are interconnected by way of a hose line system 51, wherein the latter comprises a multitude of individual hose lines, of which one hose line 52 is designated by a reference character in a manner representative of all the further hose lines. The hose lines 52, which may be connected to T-pieces so as to form branch points, channel the liquids and/or volatile components collected by the sheet-like material 13 to at least one outlet, located in the region of a bottom of the fuselage cell, at which outlet final release of the collected substances to the environment takes place. Each drainage connection can comprise a T-piece in order to make it possible to simply incorporate said drainage connections in a hose line by opening up the hose line and connecting the hose line ends to the T-piece. As an alternative, from each drainage connection a separate hose line can be routed in each case to an outlet.

List of reference characters

1. Bottom (wing box)
2. Wing box
3. Border
4. Fitting
5. Fitting
6. Fitting
7. Fitting
8. Connection point (bottom wing box)
9. Coordinate system
10. Drainage point (bottom wing box)
13. Sheet-like material
14. Holding profile
15. Counterholding profile
16. First limb } Retaining profile
17. Second limb
18. Semicircular end section
19. Connecting element
20. Drainage connection
21. Flange (drainage connection)
22. Stay bolt
23. Base (stay bolt)
24. Connecting element
25. Connecting element
26. Threaded portion
27. Nut
28. Reinforcement region (sheet-like material)
29. Sleeve
30. Elongated hole (sleeve)
31. Undulation (sheet-like material)
32. Undulation trough (sheet-like material)
33. Undulation peak (sheet-like material)
34. Liquid droplet
35. Countersunk hole
36. Countersunk hole
37. Sealant
38. Reinforcement flange (reinforcement region sheet-like material)
39. Thickening (reinforcement region)
40. Eccentric polygonal disc
41. Sleeve flange
42. Sleeve body
43. Securing hole (threaded portion stay bolt)
44. Longitudinal groove } Sleeve
45. Slope
46. Slope
47. Recess
48. Recess
49. Recess
50. Recess
51. Hose line system
52. Hose line

The invention claimed is:

1. A device for preventing fluids emanating from a wing box of an aircraft from passing to a fuselage cell of the aircraft, the device comprising:
   a border positioned in a region of a bottom or a top of the wing box; and
   a sheet-like material arranged in a region of the border, the sheet-like material including a plurality of undulating troughs and a plurality of undulating peaks, wherein a longitudinal axis of the fuselage cell lies in a direction of flight of the aircraft, wherein the plurality of undulating troughs and the plurality of undulating peaks run along the longitudinal axis of the fuselage cell, wherein in a region of at least one undulation trough of the plurality of undulating troughs at least one drainage connection with a hose line is connected to the sheet-like material for dissipation of any fluids emanating from the wing box.

2. The device according to claim 1, wherein the sheet-like material includes a reinforcement, wherein some regions of the reinforcement are impregnated with an elastomer.

3. The device according to claim 2, wherein the elastomer is an epichlorohydrin elastomer compound.

4. The device according to claim 2, wherein the reinforcement includes a thermoplastic woven fabric, a knitted fabric, an interlaid scrim, or any combination thereof.

5. The device according to claim 1, wherein the sheet-like material is connected to the wing box by the border, wherein the border includes at least one holding profile and at least one counterholding profile for clamping the sheet-like material on an edge of the border.

6. The device according to claim 1, wherein at least one stay bolt for connecting an outer edge of the sheet-like material to the wing box is arranged within the border in a region of at least one connection point of the wing box.

7. The device according to claim 6, wherein the at least one stay bolt is connected to the wing box, and the at least one stay bolt includes a threaded portion, wherein a nut can be placed onto the threaded portion for a non-positive locking connection between the sleeve and a base of the at least one stay bolt.

8. The device according to claim 7, wherein the at least one stay bolt is riveted, bolted, or bonded to the wing box.

9. The device according to claim 1, wherein the sheet-like material includes at least one reinforcement region for connection in each case to a stay bolt and for integration of a metallic sleeve with an elongated hole.

10. The device according to claim 9, wherein a nut is placed on the at least one stay bolt, wherein an eccentric polygonal disc is provided between the sleeve and the nut, wherein the eccentric polygonal disc can be placed in a longitudinal groove in a sleeve flange at least in part in a positive-locking manner, such that rotating the eccentric polygonal disc by an angular amount of less than or equal to 90° results in a defined graduated alignability of the sheet-like material parallel to a longitudinal axis of the fuselage cell.

11. The device according to claim 9, wherein the at least one reinforcement region of the sheet-like material is arranged in a region of an undulation peak of the plurality of undulating peaks.

12. The device according to claim 9, wherein the metallic sleeve is bonded in the reinforcement region.

13. The device according to claim 9, wherein the metallic sleeve is vulcanized in the reinforcement region.

\* \* \* \* \*